US005495784A

United States Patent [19]
Chen

[11] Patent Number: 5,495,784
[45] Date of Patent: Mar. 5, 1996

[54] CUTTING DEPTH SETTING DEVICE FOR A SAW MACHINE

[76] Inventor: Ruey-Zon Chen, No. 261, Jenhwa Rd., Tali City, Taichung Hsien, Taiwan

[21] Appl. No.: 314,856

[22] Filed: Sep. 29, 1994

[51] Int. Cl.⁶ .................................... B27B 5/29
[52] U.S. Cl. .................. 83/471.2; 83/490; 83/522.19; 83/529; 33/640; 116/230
[58] Field of Search .................. 83/471.2, 522.15, 83/522.16, 522.17, 522.18, 522.19, 527, 529, 490, 881, 471.3; 33/640, 641; 116/230, 231

[56] References Cited

U.S. PATENT DOCUMENTS

| | | | |
|---|---|---|---|
| 2,426,780 | 9/1947 | Malseed | 83/522.19 X |
| 3,069,781 | 12/1962 | Klaiban | 33/640 X |
| 3,316,646 | 5/1967 | Novey | 116/230 X |
| 5,046,390 | 9/1991 | Sasaki | 83/471.2 |
| 5,355,635 | 10/1994 | Sasaki et al. | 83/471.2 X |

Primary Examiner—Richard K. Seidel
Assistant Examiner—Clark F. Dexter
Attorney, Agent, or Firm—Gunn, Lee & Miller

[57] ABSTRACT

A cutting depth setting device is provided for a saw machine which includes a base portion having a positioning block protruding therefrom, a drive arm pivotally engaged with the base portion about a pivot axle, a protruding block projecting from the drive arm and located above the positioning block, a threaded hole vertically defined through the protruding block, a circular saw blade rotatably mounted on the drive arm to pivot therewith for cutting a workpiece, a working platform mounted beneath the saw blade for holding the workpiece, the cutting depth setting device including an adjusting bolt threadedly extending through the threaded hole of the protruding block to be displaced vertically relative to the protruding block, a head fixedly mounted on an upperside of the adjusting bolt for rotating the adjusting bolt, a pointer pivotally engaged on an underside of the adjusting bolt to move vertically therewith, a first panel movably mounted on the drive arm and having a flat surface which is located adjacent to the pointer and has a plurality of graduations formed thereon for aligning with the pointer, and a second panel movably mounted on the drive arm and enclosed on the first panel, and a plurality of numerals formed on the second panel for respectively aligning with the plurality of graduations.

8 Claims, 5 Drawing Sheets

CUTTING DEPTH SETTING DEVICE FOR A SAW MACHINE

BACKGROUND OF THE INVENTION

1. Field of Invention

The present invention relates to a saw machine, and more particularly to a cutting depth setting device for a saw machine.

2. Related Prior Art

A conventional saw machine is not able to be controlled to accurately adjust a cutting depth fed into a workpiece by a saw blade of the saw machine, so incurring great difficulties of an operator in the working process when he/she is manipulating the saw machine because the cutting depth fed into the workpiece is not preset.

The present invention has arisen to mitigate and/or obviate the above-mentioned disadvantages of the conventional saw machine.

SUMMARY OF THE INVENTION

The primary objective of the present invention is to provide a cutting depth setting device which is able to randomly adjust and accurately preset a cutting depth fed into a workpiece by a saw blade of a saw machine.

In accordance with one aspect of the present invention, there is provided a cutting depth setting device for a saw machine which comprises a base portion having a positioning block protruding therefrom, a drive arm pivotally engaged with the base portion about a pivot axle, a protruding block projecting from the drive arm and located above the positioning block, a threaded hole vertically defined through the protruding block, a circular saw blade rotatably mounted on the drive arm to pivot therewith for cutting a workpiece, a working platform mounted beneath the saw blade for holding the workpiece, the cutting depth setting device comprising an adjusting bolt threadedly extending through the threaded hole of the protruding block to be displaced vertically relative to the protruding block, a head fixedly mounted on an upperside of the adjusting bolt for rotating the adjusting bolt, a pointer pivotally engaged on an underside of the adjusting bolt to move vertically therewith, a first panel movably mounted on the drive arm and having a flat surface which is located adjacent to the pointer and has a plurality of graduations formed thereon for aligning with the pointer, and a second panel movably mounted on the drive arm and enclosed on the first panel, a plurality of numerals formed on the second panel for respectively aligning with the plurality of graduations.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENTS

Figure 1:
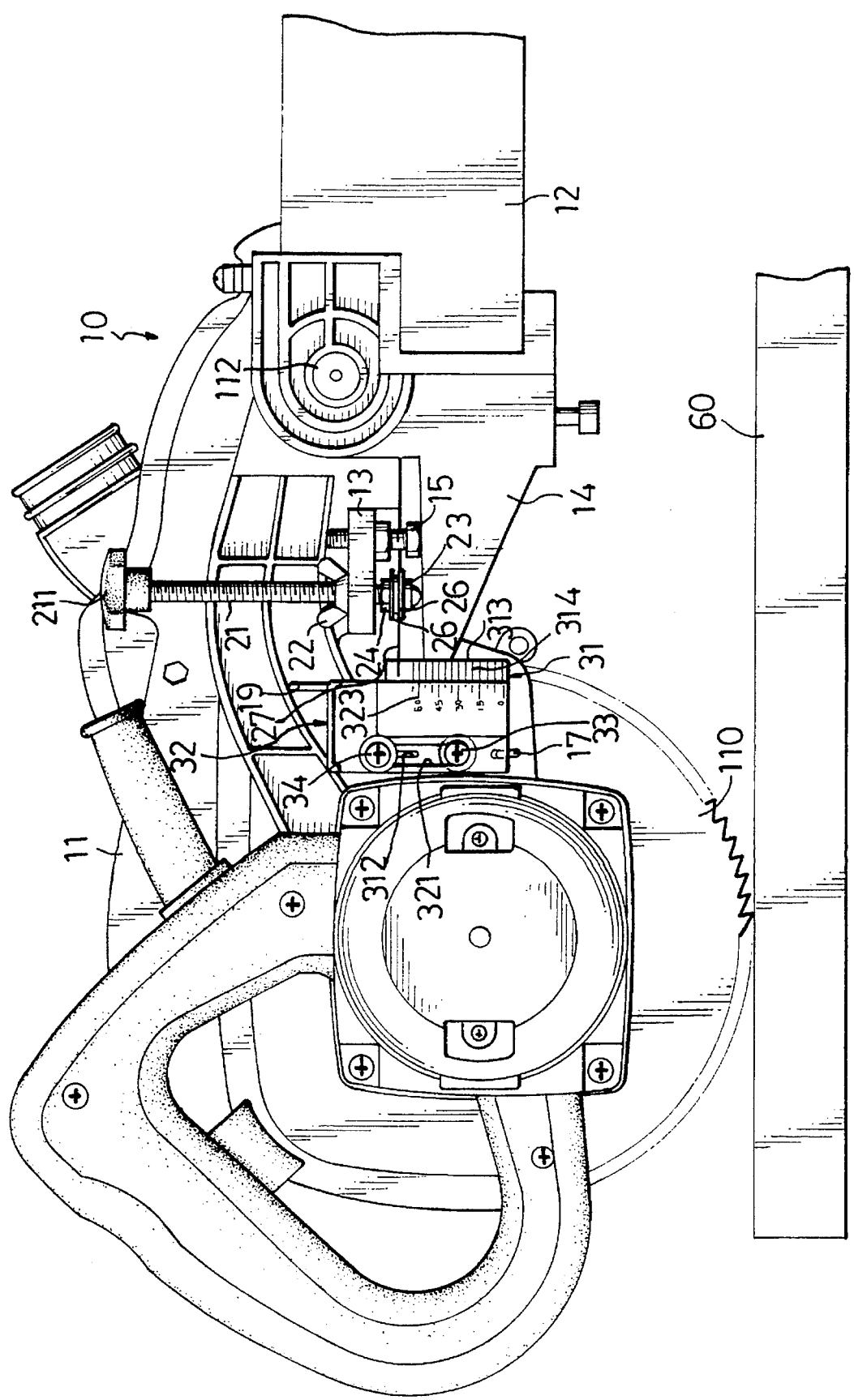
FIG. 1 is a front plan view of a cutting depth setting device for a saw machine in accordance with the present invention.
Figure 2:
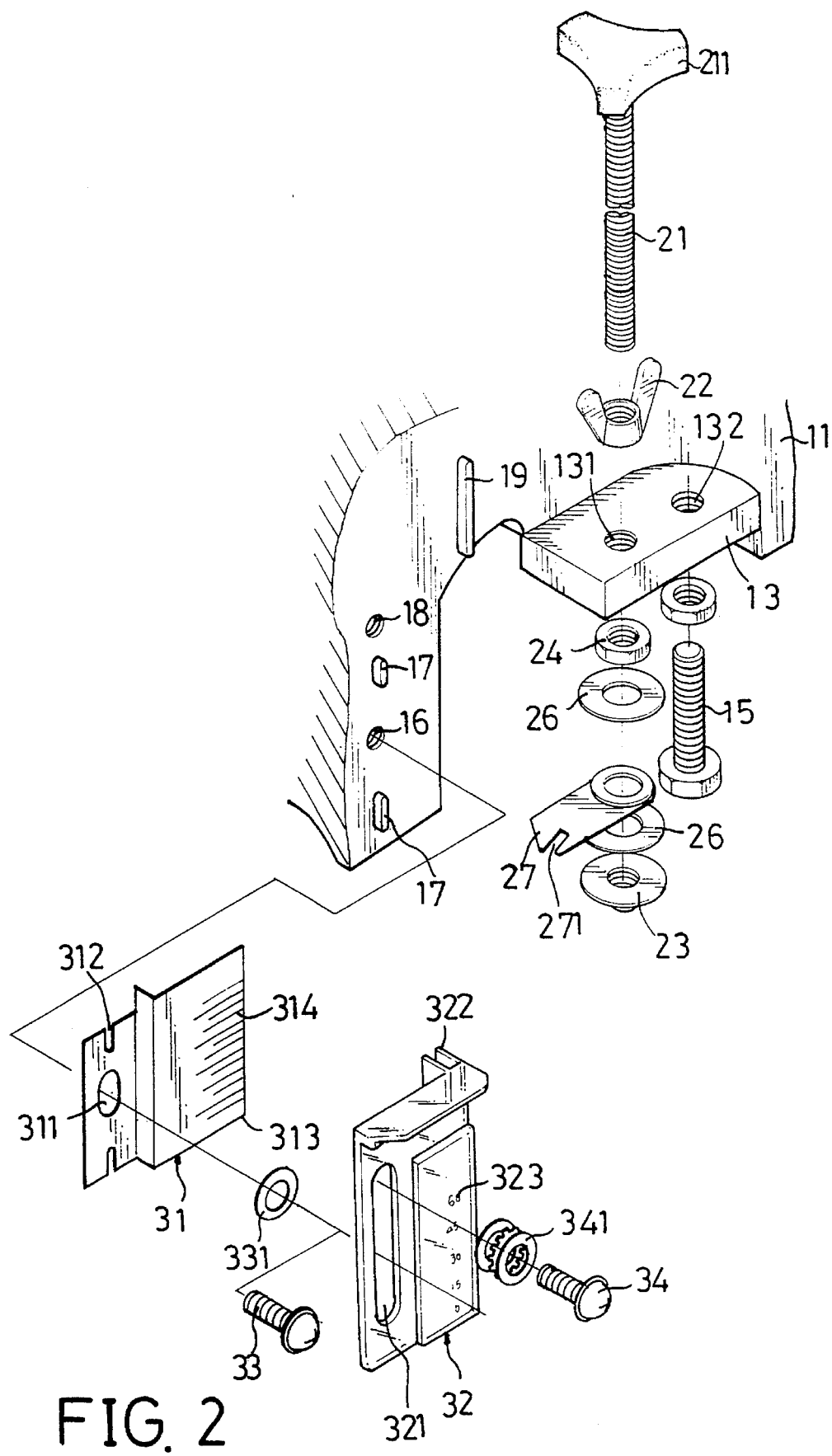
FIG. 2 is an exploded view of the cutting depth setting device as shown in FIG. 1.

Referring to the drawings, and initially to FIGS. 1 and 2, a cutting depth setting device in accordance with the present invention is provided for a saw machine 10 which comprises a base portion 12 having a positioning block 14 protruding therefrom (see FIG. 1), a drive arm 11 pivotally engaged with the base portion 12 about a pivot axle 112, a protruding block 13 projecting from the drive arm 11 and locating above the positioning block 14, a threaded hole 131 vertically defined through the protruding block 13, a circular saw blade 110 rotatably mounted on the drive arm 11 to pivot therewith for cutting a workpiece 80, a working platform 60 mounted beneath the saw blade 110 for holding the workpiece 80.

The cutting depth setting device comprises an adjusting bolt 21 threadedly extending through the threaded hole 131 of the protruding block 13 to displace vertically relative to the protruding block 13, a head 211 fixedly mounted on an upperside of the adjusting bolt 21 for rotating the adjusting bolt 21, a butterfly nut 22 threadedly mounted around the adjusting bolt 21 and securely urged on an upperside of the protruding block 13 to fix the adjusting bolt 21 in position, a cap nut 23 threadedly engaged on a lowermost portion of the adjusting bolt 21, a pair of washers 26 mounted around the adjusting bolt 21 and located above the cap nut 23, a pointer 27 mounted around the adjusting bolt 21 and pivotally engaged between the pair of washers 26 so as to move vertically with the adjusting bolt 21, a fastening nut 24 threadedly mounted around the adjusting bolt 21 and urged against one of the pair of washers 26. It is appreciated that the cap nut 23 is able to abut against an upperside of the positioning block 14 when the drive arm 11 is rotated counterclockwise about the pivot axle 112.

A first panel 31 is movably mounted on the drive arm 11 along a vertical direction thereof, a pair of elongated openings 312 are respectively defined in an upper portion and a lower portion of the first panel 31 and an elongated slot 311 is defined therebetween, a bolt 33 extending through a washer 331 and the elongated slot 311 and threadedly engaged in a hole 16 defined in the drive arm 11 such that the first panel 31 is able to move up and down vertically on the drive arm 11, a pair of flanges 17 vertically formed on the drive arm 11 and respectively received in a corresponding opening 312 for limiting excess movement of the first panel 31. The first panel 31 has a flat surface 313 partially received in a recess 271 which is defined in the pointer 27, whereby, when the adjusting bolt 21 is rotated to move up and down, the pointer 27 is pivoted therewith and is limited by the flat surface 313 to move up and down vertically with the adjusting bolt 21, the flat surface 313 has a plurality of equi-distanced graduations 314 formed thereon, one of the which is able to align with the pointer 27. A second panel 32 is movably mounted on the drive arm 11 and enclosed on the first panel 31, and a plurality of equi-distanced numerals 323 are formed on the second panel 32 for respectively aligning with the plurality of graduations 314. Preferably, an elongated slot 321 is vertically defined in the second panel 32 and aligns with the elongated slot 311 in the first panel 31, a bolt 34 extending through a washer member 341 and the elongated slot 321 and threadedly engaged in a hole 18 which is defined in the drive arm 11 located above the upper flange 17, such that the second panel 32 is movable relative to the drive arm 11, a guiding member 19 vertically formed on the drive arm 11, a channel 322 vertically defined in the second panel 32 for receiving the guiding member 19 therein such that the second panel 32 is able to move vertically relative to the drive arm 11.

Figure 3:
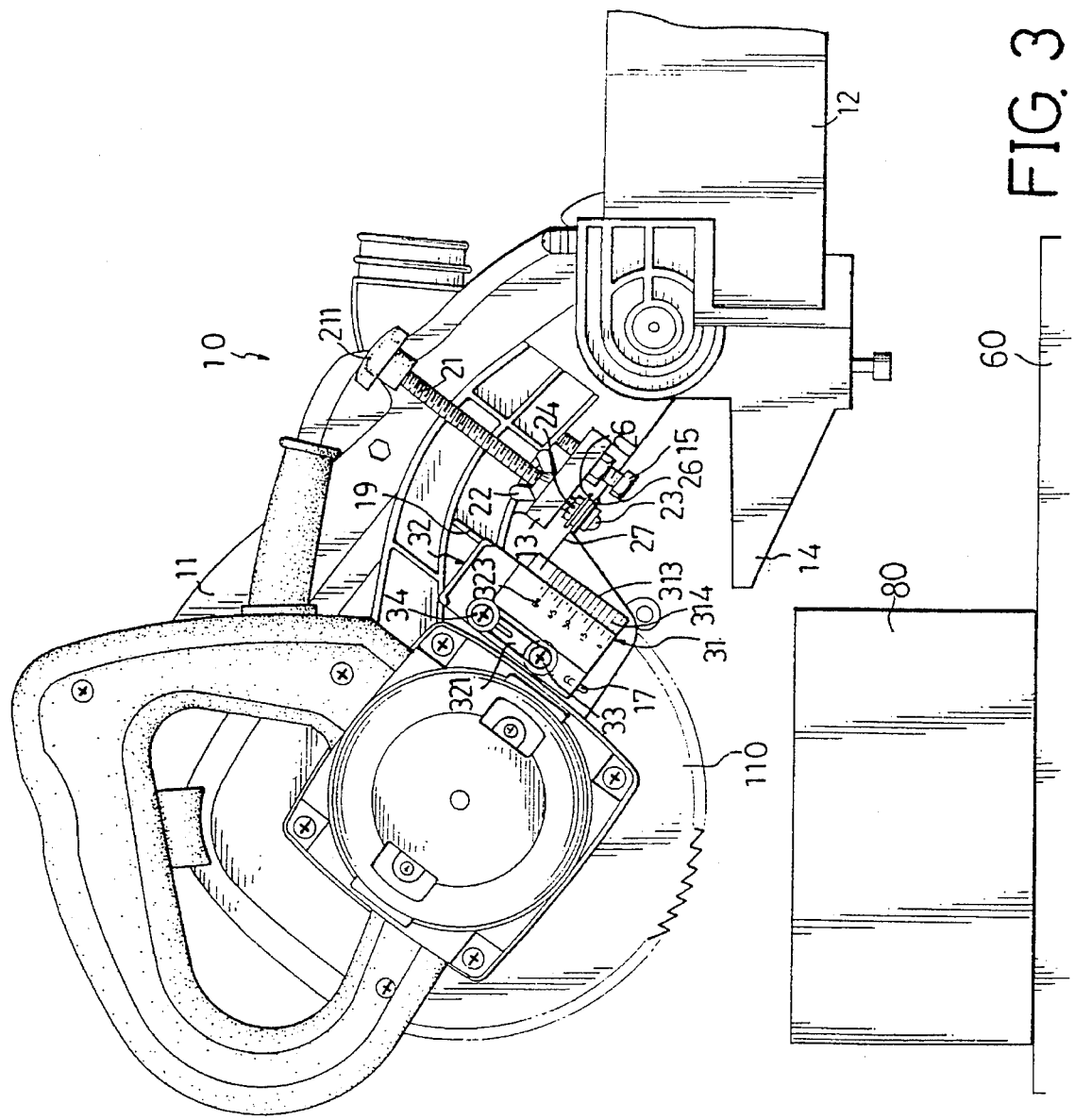
FIG. 3 is a front plan view of the cutting depth setting device in a tilting status.
Figure 4:
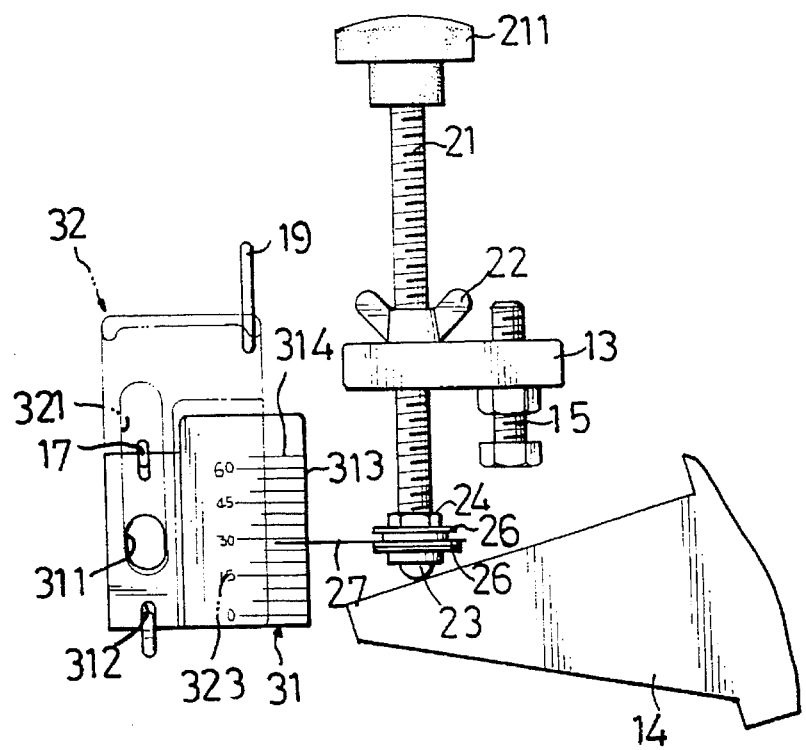
FIG. 4 an operational view of the cutting depth setting device showing a pointer not aligning with graduations and numerals.
Figure 5:
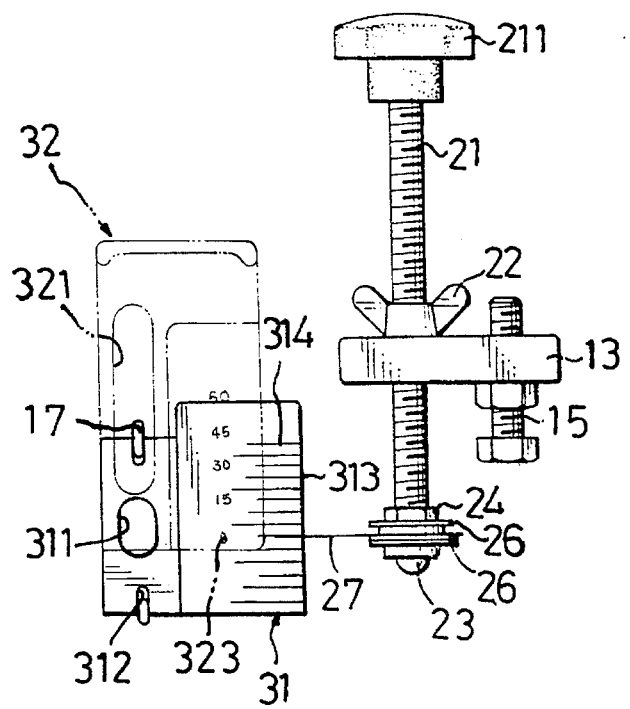
FIG. 5 an operational view of the cutting depth setting device showing the pointer aligning with a numeral "0"
Figure 6:
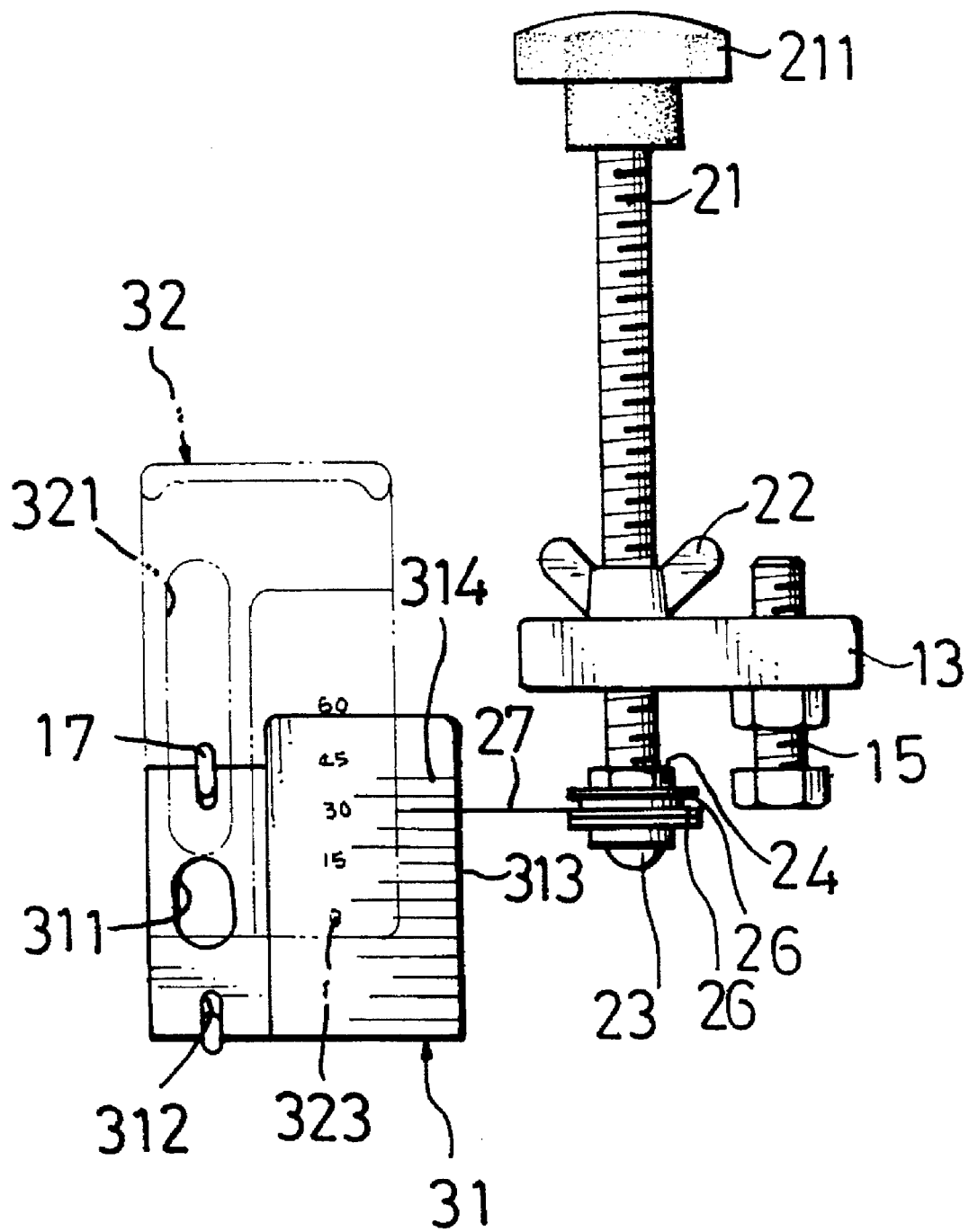
FIG. 6 an operational view of the cutting depth setting device showing the pointer aligning with a numeral "30".

In operation, referring to FIGS. 3 and 4, the drive arm 11 is initially rotated clockwise about the pivot axle 112 [not shown here] to hold a workpiece 80 on the working platform 60, the circular saw blade 110 is then lowered down to get into contact with the workpiece 80, the butterfly nut 22 is rotated to loosen the adjusting bolt 21 which is therefore able to be rotated via the head 211 to move downwardly, thereby driving the pointer 27 together with the cap nut 23 to displace along a vertical direction of the first panel 31 to a position as shown in FIG. 4 where the cap nut 23 abuts against the upperside of the positioning block 14. At this point, it can be clearly seen that the pointer 27 is not aligning with any of the graduations 314 on the first panel 31. Referring to FIG. 5, the first panel 31 is moved upwardly to a position where one of the graduations 313 is aligning with the pointer 27, the second panel 32 (as shown in phantom lines) is then moved upwardly to a position where the numeral "0" is aligning with the pointer 27. Referring to FIG. 6, if the cutting depth of the workpiece 80 is preset at, for example, 30 millimeter (mm), the adjusting bolt 21 is rotated counter clockwise via the head 211 to move upwardly, thereby displacing the pointer 27 together with the cap nut 23 upwardly to a position where the pointer 27 is aligning with the numeral "30", whereby, the circular saw blade 110 is able to feed into the workpiece 80 by rotation of the drive arm 11 and the movement thereof is stopped when the cap nut 23 abuts against the positioning block 14 such that the workpiece 80 is cut by the saw blade 110 with a depth equal to "30" mm. Accordingly, by such an arrangement, the cutting depth fed into the workpiece 80 by the saw blade 110 is randomly adjusted and accurately preset. It is appreciated that a positioning bolt 15 is extended from an underside of the protruding block 13 to be threadedly engaged into a hole 132 which is defined through the protruding block 13 beside the hole 131 thereof.

It should be clear to those skilled in the art that further embodiments of the present invention may be made without departing from the teachings of the present invention.

I claim:

1. A cutting depth setting device for a saw machine (10) which comprises a base portion (12) having a positioning block (14) protruding therefrom, a drive arm (11) pivotally engaged with said base portion (12) about a pivot axle (112), a protruding block (13) projecting from said drive arm (11) and located above said positioning block (14), a threaded hole (131) vertically defined through said protruding block (13), a circular saw blade (110) rotatably mounted on said drive arm (11) to pivot therewith for cutting a workpiece (80), a working platform (60) mounted beneath said saw blade (110) for holding said workpiece (80), said cutting depth setting device comprising:

an adjusting bolt (21) threadedly extending through said threaded hole (131) of said protruding block (13) to be displaced vertically relative to said protruding block (13), a head (211) fixedly mounted on an upperside of said adjusting bolt (21) for rotating said adjusting bolt (21), a pointer (27) pivotally engaged on an underside of said adjusting bolt (21) to move vertically therewith;

a first panel (31) movably mounted on said drive arm (11) and having a flat surface (313) which is located adjacent to said pointer (27) and has a plurality of graduations (314) formed thereon for aligning with said pointer (27); and a second panel (32) movably mounted on said drive arm (11) and enclosed on said first panel (31), a plurality of numerals (323) formed on said second panel (32) for respectively aligning with said plurality of graduations (314).

2. The cutting depth setting device in accordance with claim 1, wherein said plurality of graduations (314) are spaced equi-distanced with respect to each other.

3. The cutting depth setting device in accordance with claim 1, wherein said plurality of numerals (323) are spaced equi-distanced with respect to each other.

4. The cutting depth setting device in accordance with claim 1, further comprising a butterfly nut (22) threadedly mounted around said adjusting bolt (21) and tightened against an upperside of said protruding block (13).

5. The cutting depth setting device in accordance with claim 1, wherein said pointer (27) defines a recess (271) for partially receiving said flat surface (313) of said first panel (31) therein such that one of said graduations (314) on said flat surface (313) is able to align with said pointer (27).

6. The cutting depth setting device in accordance with claim 1, further comprising a cap nut (23) threadedly engaged on a lowermost portion of said adjusting bolt (21), said cap nut (23) positioned to abut against an upperside of said positioning block (14) when said drive arm (11) is rotated about said pivot axle (112), a pair of washers (26) mounted around said adjusting bolt (21) and located above said cap nut (23), said pointer (27) being mounted around said adjusting bolt (21) and pivotally engaged between said pair of washers (26), a fastening nut (24) threadedly mounted around said adjusting bolt (21) and tightened against one of said pair of washers (26).

7. The cutting depth setting device in accordance with claim 1, wherein said first panel (31) defines a pair of elongated openings (312) respectively in an upper portion and a lower portion thereof and defines an elongated slot (311) therebetween, a bolt (33) extending through a washer (331) and said elongated slot (311) and threadedly engaged in a hole (16) defined in said drive arm (11) such that said first panel (31) is movably engaged on said drive arm (11), a pair of flanges (17) vertically formed on said drive arm (11), each flange respectively received in a corresponding one of said elongated openings (312) for limiting excess movement of said first panel (31).

8. The cutting depth setting device in accordance with claim 7, wherein said second panel (32) vertically defines an elongated slot (321) therein, a bolt (34) extending through a washer member (341) and said elongated slot (321) and threadedly engaged in a hole (18) defined in said drive arm (11) such that said second panel (32) is movable relative to said drive arm (11), a guiding member (19) vertically formed on said drive arm (11), a channel (322) vertically defined in said second panel (32) for receiving said guiding member (19) therein such that said second panel (32) is able move vertically relative to said drive arm (11).

\* \* \* \* \*